Jan. 26, 1954  E. BUEHLER  2,667,567
ART OF HEATING DEVICES
Filed March 27, 1951
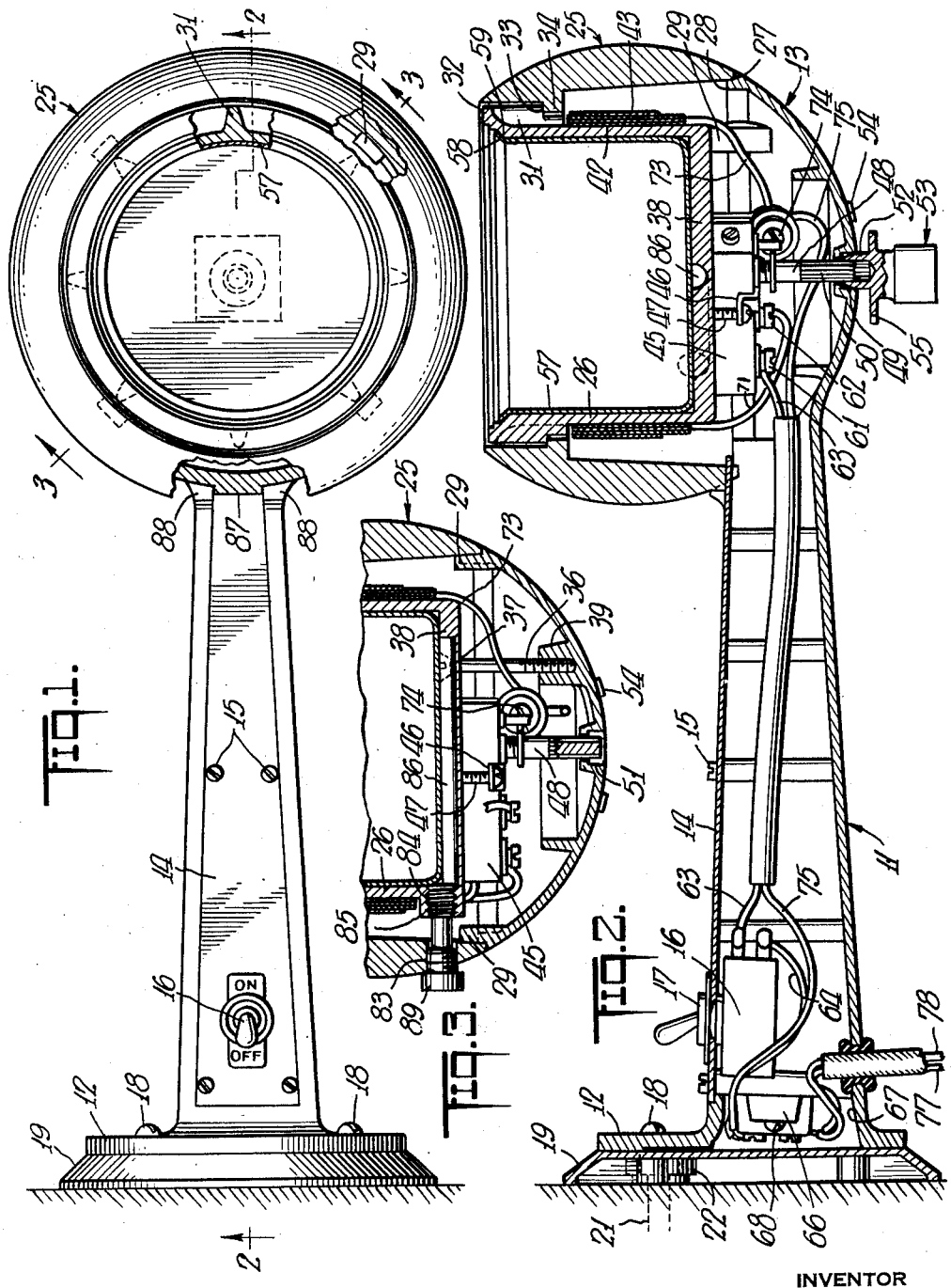
INVENTOR
*Emil Buehler*
BY
*Dean Fairbank & Hirsch*
ATTORNEYS Patented Jan. 26, 1954

2,667,567

UNITED STATES PATENT OFFICE 2,667,567

ART OF HEATING DEVICES

Emil Buehler, North Haledon, N. J., assignor to American Aerovap, Inc., a corporation of New York Application March 27, 1951, Serial No. 217,858

6 Claims. (Cl. 219—44)

This invention relates to the art of heating devices and more particularly to a device for dispensing insecticides and fumigants in the form of a vapor.

It is among the objects of the invention to provide a heating device of the above type that is rugged, compact and of neat appearance and may readily be mounted on a wall or post with a minimum of effort, that is easy to charge and the operating temperature of which may readily be adjusted without disassembly of the device, that has but few parts that are not likely to become deranged and that lends itself to mass production and may quickly be disassembled for inspection and repair.

According to the invention, a cup-shaped receptacle of heat conducting metal is provided, girdled by a plurality of heating elements electrically insulated therefrom but in effective heat conducting relation thereto. The receptacle, which has a thermostat mounted thereon, is affixed in a suitable holder and the thermostat has a control shaft extending through the bottom of said holder to permit adjustment of the operating temperature of the device from the exterior thereof. A metal cup is preferably removably disposed in said receptacle and is snugly fitted therein to be heated thereby, said cup containing a solid insecticide that is not volatile at room temperature.

In the accompanying drawings in which are shown one or more of various possible embodiments of the several features of the invention, Fig. 1 is a top plan view of the device with parts broken away, Fig. 2 is a longitudinal sectional view thereof, taken along line 2—2 of Fig. 1, and Fig. 3 is a sectional view taken along line 3—3 of Fig. 1.

Referring now to the drawings, the device desirably comprises a hollow bracket arm 11 preferably of cast iron, aluminum or the like which is trough shaped in cross section and may taper from the mounting plate 12 at one end thereof integral therewith to the inverted dome 13 at the other end thereof, also integral therewith, the mouth of said dome lying in a plane at right angles to that of said mounting plate.

A cover plate 14 which provides access to the interior of the hollow bracket arm 11 is removably affixed to the open top thereof by means of screws 15 and mounts an on-off switch 16 rigidly affixed thereto by lock nut 17 adjacent the mounting plate 12. Mounting plate 12, which is preferably circular, is desirably affixed by screws 18 to a wall plate 19 which may be mounted on a wall or post by screws 21 extending into countersunk openings 22 in wall plate 19.

The inverted dome 13 of bracket arm 11 together with a hollow casing 25, preferably of insulating material mounted thereon, form a holder for a substantially cylindrical cup-shaped heating receptacle 26 of heat conducting material such as aluminum. Although the casing 25 may be mounted on the inverted dome 13 in any suitable manner, said dome 13 preferably has an external annular shoulder 27 near the upper rim 28 thereof, the latter having a plurality of upstanding fingers 29 spaced along the inner periphery thereof, and said casing 25 is seated on annular shoulder 27 and snugly encompasses fingers 29 so as to be securely retained on said shoulder.

As shown in Figs. 1 and 2, the receptacle 26 has a plurality of vertical bosses 31 on its outer face, spaced along the periphery of said receptacle near the mouth 32 thereof, each of said bosses having a shoulder 33 near the bottom thereof which rests on an inwardly extending flange 34 near the mouth of casing 25.

Means are provided to secure the receptacle 26 in the casing 25 and to secure said casing upon the inverted dome 13. Although any suitable means could be used for this purpose, in the embodiment herein shown such means desirably comprises a plurality of screws 36 which extend through openings 37 in the floor 38 of the receptacle 26 and are screwed respectively into threaded openings in a plurality of bosses 39 on the floor of the inverted dome 13 and preferably cast integral therewith.

The receptacle 26 has a plurality of heating elements 42 mounted thereon which preferably are of the type shown in Patent No. 2,540,095 dated February 6, 1951. The heating elements 42 which are insulated in conventional manner, are affixed in longitudinally spaced relation to a metal strip 43 which girdles the side wall of the heating receptacle 26 and is affixed thereto in any suitable manner.

Affixed to the undersurface of the floor 38 of the receptacle 26 is a thermostat 45 which may be of conventional type and is shown as an elongated block. The thermostat is preferably mounted by means of a clamp strap 46 extending transversely thereacross and affixed at each end as by screws 47 to the floor 38 of the heating receptacle 26. The thermostat 45 desirably has a control shaft 48 depending therefrom, which extends through an axial opening 49 in dome 13, to provide ready access to said shaft for rotation thereof in order to permit thermostat adjustment.

Although the control shaft 48 may be rotated in any suitable manner, in the illustrative embodiment herein shown, the shaft is desirably fluted along its length as at 50 and the opening 49 is countersunk as at 51 on the outer surface of the dome 13 to provide clearance about said shaft so that the end thereof may be securely yet detachably engaged by the internally fluted wall of the cylindrical extension 52 of an adjusting tool 53 for rotation of said control shaft. Desirably the undersurface of the dome 13 adjacent countersunk opening 51 has scale markings 54 thereon so that upon rotation of adjusting tool 53, which has a pointer conformation 55 preferably formed integral therewith, the thermostat 45 may be adjusted to any desired setting.

Removably positioned in said heating receptacle 26 is a cup 57 which may be of anodized aluminum, Pyrex or the like, of diameter slightly less than the inner diameter of said receptacle and having an outwardly flared rim 58 which rests on the beveled rim 59 of the receptacle to be supported thereby. The dimensions of the cup are so chosen with respect to the dimensions of the heating receptacle that the wall and bottom of the cup will lie in close juxtaposition to the corresponding parts of the receptacle for facility of heat transfer therefrom to the cup.

In order electrically to connect the thermostat 45, the heating elements 42 and the switch 16 to a source of power, the thermostat 45 desirably has a pair of terminals 61 and 62, the former of which is connected by lead 63 to one side of switch 16, the other side of which is connected by lead 64 to a screw (not shown) on a terminal block 66. The terminal block is desirably positioned in a recess 67 in mounting plate 12 adjacent arm 11, the block being desirably affixed in said recess by screws 68.

The heating elements 42 which illustratively are in parallel, are connected by lead 71 to terminal 62 of thermostat 45 and by lead 73 to a terminal 74 mounted on the under surface of the floor 38 of the receptacle, said terminal 74 being connected by lead 75 to a screw (not shown) on terminal block 66. In order to complete the circuit, a source of power is connected by power mains 77 and 78 to the screws on the terminal block 68.

With the circuit thus described, the parallel connected heating elements 42 and the thermostat 45 are in series with the source of power so that when said thermostat 45, which is of the normally closed type, is open, no current will flow to the heating elements and hence the latter will cool.

In order to determine if the device is operating properly, a thermometer (not shown) may be inserted through an opening 83 in casing 25 into a lateral opening 84 in an embossment 85 on the heating receptacle 26 which has a radial groove 86 in the top surface of the floor 38 thereof aligned with opening 84. Inasmuch as the thermometer will lie between the floor 38 of the heating receptacle and the under surface of cup 57, which may rest on said floor 38, the thermometer will accurately indicate the temperature of the contents of the cup.

In order that the opening 83 in the casing 25 will be aligned with the opening 84 in the heating receptacle which is affixed to the dome 13, when the parts are assembled, the casing 25 is desirably keyed in fixed position with respect to the heating receptacle 26, as by means of a key conformation 87 on the lower edge of said casing 25, which is interposed between spaced upright finger 88 desirably formed integral with bracket arm 11 on the upper edges thereof adjacent dome 13. Desirably a removable plug 89 closes opening 83 in casing 25 and is screwed into the opening 84 in embossment 85, to seal said openings when the latter are not in use, thereby to prevent the accumulation of dirt or dust in the holder.

In the operation of the device, when switch 16 is closed, a circuit will be completed through the normally closed thermostat 45 and through the heating elements 42. As a result the receptacle 26 will be heated as will be the contents of the cup 57 therein causing volatilization of the contents of the latter. The thermostat 45 is set to open the circuit to the heating elements 42 when the temperature rises to a predetermined value so that the consequent reduction in temperature will cause the thermostat to cool and again close for more intense heating after the temperature has fallen to a predetermined value. Thus, overheating or decomposition of the contents of the cup 57 is avoided, yet the temperature is at all times sufficiently elevated for volatilization at the desired rate.

With the construction herein described, a neat, compact yet highly efficient heating device is provided which very dependably retains the temperature of the contents of the cup within a predetermined range and the operating temperature of which may readily be adjusted from the exterior of the device by merely inserting the adjustment tool into the countersunk opening in the dome 13 to rotate the control shaft 48.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment of the character described comprising a bracket arm having a mounting plate unitary therewith at one end thereof and an inverted dome portion at the opposite end thereof, the mouth of said dome lying in a plane at right angles to that of said mounting plate, a hollow casing mounted on said dome, said casing and said dome defining a holder, a substantially cup-shaped heating receptacle in said holder, said receptacle having shoulder portions rigid therewith and said casing having an inwardly extending flange seating said shoulder portions, whereby when said receptacle is affixed to said dome the casing will be retained on the latter, a thermostat mounted on the under surface of the floor of said receptacle above the inner surface of said dome, said thermostat having a control shaft extending through an opening in said dome, said control shaft having a fluted end, so that an adjustment tool having an internally fluted cylindrical extension adapted to coact with the fluted end of said shaft may serve to adjust the thermostat.

2. Equipment of the character described comprising a bracket arm having a mounting plate unitary therewith at one end thereof and an inverted dome portion at the opposite end thereof, the mouth of said dome lying in a plane at right angles to that of said mounting plate, a hollow casing mounted on said dome, said casing and said dome defining a holder, a substantially cup-shaped heating receptacle in said holder, said receptacle having shoulder portions rigid therewith and said casing having an inwardly extending flange seating said shoulder portions, whereby when said receptacle is affixed to said dome the casing will be retained on the latter, a thermostat mounted on the under surface of the floor of said receptacle above the inner surface of said dome, said thermostat having a control shaft extending through an opening in said dome, said opening being countersunk at the outer surface thereof, said control shaft having a fluted end extending into the countersunk portion of said opening, so that an adjustment tool having an internally fluted cylindrical extension adapted to be inserted into said countersunk opening and to coact with the fluted end of said shaft may serve to adjust the thermostat.

3. Equipment of the character described comprising a bracket arm having a mounting plate unitary therewith at one end thereof and an inverted dome portion at the opposite end thereof, the mouth of said dome lying in a plane at right angles to that of said mounting plate, a hollow casing mounted on said dome, said casing and said dome defining a holder, a substantially cup-shaped heating receptacle in said holder, said receptacle having shoulder portions rigid therewith and said casing having an inwardly extending flange seating said shoulder portions, means to affix said receptacle to said inverted dome, a thermostat mounted on the under surface of the floor of said receptacle above the inner surface of said dome, said thermostat having a control shaft extending through an opening in said dome whereby said control shaft may be rotated from the exterior of the holder to adjust said thermostat, said dome having scale markings on the outer surface thereof adjacent said opening, and means for coaction with the protruding end of said control shaft to rotate the latter, said means having a pointer associated therewith for movement across the scale markings.

4. Equipment of the character described comprising a bracket arm having an inverted dome conformation at its free end, a hollow casing removably mounted on said dome, a substantially cup-shaped heating receptacle in said casing affixed to said dome, and spaced from the inner surface thereof, a thermostat affixed to the undersurface of said receptacle above the inner surface of said dome, said thermostat having a control shaft extending through an opening in said dome to permit adjustment of the thermostat from the exterior of the casing, said casing and said receptacle each having an opening therethrough, and means to align said openings whereby when a cup is positioned in said receptacle and a thermometer is inserted through said openings into said receptacle, such thermometer will be beneath said cup, said means comprising a pair of spaced upstanding fingers on said bracket arm adjacent said dome and a key conformation at the lower edge of said casing adapted to be positioned between said fingers.

5. Equipment of the character described comprising a bracket arm having a mounting plate unitary therewith at one end thereof and an inverted dome portion at the opposite end thereof, the mouth of said dome lying in a plane at right angles to that of said mounting plate, said mouth having an external annular shoulder and a plurality of spaced upstanding fingers formed integral with the inner edge of said mouth and spaced along the periphery thereof, a hollow casing having its bottom rim seated on said shoulder and encompassing said upstanding fingers, said casing and said dome defining a holder, a substantially cup-shaped heating receptacle in said holder, said receptacle having shoulder portions rigid therewith and said casing having an inwardly extending flange seating said shoulder portions, means to affix said receptacle to said inverted dome, a thermostat mounted on the under surface of the floor of said receptacle above the inner surface of said dome, said thermostat having a control shaft extending through an opening in said dome whereby said control shaft may be rotated from the exterior of the holder to adjust said thermostat.

6. Equipment of the character described comprising a bracket arm having an inverted dome conformation at its free end, the mouth of said dome having an external annular shoulder and a plurality of spaced upstanding fingers formed integral with the inner edge of said mouth and spaced along the periphery thereof, a hollow casing having its bottom rim seated on said shoulder and encompassing said upstanding fingers, a substantially cup-shaped heating receptacle in said casing affixed to said dome, and spaced from the inner surface thereof, a thermostat affixed to the under surface of said receptacle above the inner surface of said dome, said thermostat having a control shaft extending through an opening in said dome to permit adjustment of the thermostat from the exterior of the casing, said casing and said receptacle each having an opening therethrough, and means to align said openings whereby when a cup is positioned in said receptacle and a thermometer is inserted through said openings into said receptacle, such thermometer will be beneath said cup, said means comprising a pair of spaced upstanding fingers on said bracket arm adjacent said dome and a key conformation at the lower edge of said casing adapted to be positioned between said fingers.

EMIL BUEHLER.

References Cited in the file of this patent

UNITED STATES PATENTS

| Number | Name | Date |
| --- | --- | --- |
| 1,404,317 | Pieper et al. | Jan. 24, 1922 |
| 1,680,621 | Kercher | Aug. 14, 1928 |
| 2,155,930 | Chapman | Apr. 25, 1939 |
| 2,311,164 | Ekstedt | Feb. 16, 1943 |
| 2,502,764 | Taft | Apr. 4, 1950 |
| 2,540,095 | Buehler | Feb. 6, 1951 |
| 2,541,637 | Christopher et al. | Feb. 13, 1951 |
| 2,616,024 | Laibow | Oct. 28, 1952 |